United States Patent [19]

Knopf

[11] 4,143,375
[45] Mar. 6, 1979

[54] METHOD AND APPARATUS FOR PREVENTING JAMMING OF LOCATING AND TRANSMISSION SYSTEMS

[75] Inventor: Alois Knopf, Ottobrunn, Fed. Rep. of Germany

[73] Assignee: Messerschmitt-Bölkow-Blohm, Fed. Rep. of Germany

[21] Appl. No.: 795,071

[22] Filed: May 9, 1977

[30] Foreign Application Priority Data

May 20, 1976 [DE] Fed. Rep. of Germany ....... 2622419

[51] Int. Cl.$^2$ ............................................... G01S 7/36
[52] U.S. Cl. .................................................. 343/18 E
[58] Field of Search ...................... 343/18 E; 325/132; 179/1.5 M

[56] References Cited

U.S. PATENT DOCUMENTS

| | | | |
|---|---|---|---|
| 3,163,862 | 12/1964 | Jenny | 343/18 E |
| 3,858,219 | 12/1974 | Hull | 343/18 E |
| 3,866,224 | 2/1975 | Porter et al. | 343/18 E |
| 3,878,525 | 4/1975 | Alpers | 343/18 E |
| 3,947,848 | 3/1976 | Carnahan et al. | 343/18 E |
| 3,981,013 | 9/1976 | Christensen | 343/18 E |
| 4,038,659 | 7/1977 | Hamer et al. | 343/18 E |

*Primary Examiner*—Maynard R. Wilbur
*Assistant Examiner*—Lawrence Goodwin
*Attorney, Agent, or Firm*—McGlew and Tuttle

[57] ABSTRACT

In the method, useful signals from an originating station are enveloped by counter-counter measure additional signals, independent of the useful signals, transmitted from the originating station independent of the locating and transmission system, and effective to force a jammer, having a limited available jamming power, to diminish or shift the density of its spectral jamming output. The useful signals are enveloped in a time range, a frequency range, and/or a spatial range, and the useful signals and the additional signals may have frequencies which differ from each other. In one embodiment of the apparatus, the useful signals and the additional signals are supplied to respective inputs of a multiplexer whose output is connected to a transmitter connected to a radiator which may be either an optical radiator or an electromagnetic radiator. In another embodiment, the two signals are supplied to respective transmitters, with the superposition of a synchronous control signal from a timing generator, and the two transmitters are connected to a coupler in turn connected to the radiator. In a third embodiment of the apparatus, the two signals are supplied to respective inputs of a frequency dividing network connected to the radiator. In a further embodiment of the invention, the useful signals and the additional signals are supplied to respective radiators, with the radiator radiating the useful signals having a narrow lobar characteristic and the radiator radiating the additional signals having a wide lobar characteristic enveloping the narrow lobar characteristic.

5 Claims, 10 Drawing Figures

METHOD AND APPARATUS FOR PREVENTING JAMMING OF LOCATING AND TRANSMISSION SYSTEMS

FIELD AND BACKGROUND OF THE INVENTION

This invention relates to a method of preventing jamming of locating and transmission systems, as well as to apparatus for carrying out the method.

DESCRIPTION OF THE PRIOR ART

The development of radar devices for military purposes is directed mainly to the quickest possible detection of approaching enemy missiles. Along with this development, search is made for means which are suitable for fighting radars. Such electronic defensive measures (Electronic Counter Measures, abbreviated ECM) act in various ways and have achieved high technical standards. A distinction is made between passive and active ECM methods.

Of the passive ECM methods, i.e., non-radiating, the so-called chaff is best known. Chaff is a very large quantity of metallic resonance dipoles, which dipoles are ejected from an airplane and rapidly form a cloud having a large retroreflective surface. Airborne machines for cutting the chaff to resonant lengths, this length being controlled by an automatic receiver measuring the frequency of the respective incident radar signals, are also known.

In the known active ECM methods, i.e., radiating, a distinction is made between noise jammers and deception jammers (repeaters). Noise jammers transmit noise signals which are almost undistinguishable from the background noise inherent in the reception. Thus, they are aimed at masking the radar response proper. Deception jammers amplify the received signal and retransmit it at a stronger level, with a simultaneous modulation, in order to deceive the range and velocity gates in the ground-based receiver. A combination of noise and deception jammers is also well-known.

As compared to a noise jammer having the same efficiency, a deception jammer offers the advantage of a small power requirement but, at the same time, has the disadvantage of being specific for only one adversary system or for a very small number of such systems.

There are also known automatically operating jammers which are capable, within a definite response time and based on the identification of the signal, of concentrating their available jamming power on any specific radar system (power management) ; c.f., for example, "Aviation Week & Space Technology," Jan. 27, 1975, page 41 (47).

As to the jamming of an originating radar installation by an adversary's ECM methods, attempts are made to develop defensive measures, i.e., measures against electronic countermeasures, which are known under the term ECCM (Electronic Counter Counter Measures). Such measures are designed to enhance the capability of radar installations to resist defensive actions of any kind.

Up to the present time, only passive ECCM methods are known, particularly, the simultaneous use of a plurality of frequencies and of jam-proof modulation techniques; cf. "Aviation Week & Space Technology", Jan. 27, 1975, pp. 63 to 84. Aside from the Electronic Counter Counter Measures (ECCM), Optical Counter Counter Measures (OCCM) are also known.

However, there are limits to the application of passive ECCM/OCCM methods at the reception side of the originating system to be protected insofar as the defensive measures must not adversely affect this radar system in the accomplishment of its function. In addition, because of the modulation at the transmitting end, determined by the requirements of the system, the emitted spectrum (even with stochastic signals) is reversibly combined, in a well-defined manner, with the entire system, so that it is definitely possible for the adversary to infer the nature of the defensive system from the signature of the signals.

SUMMARY OF THE INVENTION

The present invention is directed to a method and to apparatus for carrying out the same which provides measures against electronic defensive measures and is free from the disadvantages mentioned above and which ensures a quite satisfactory, jam-proof, operation of locating and transmission systems, even in the presence of an adversary's intentional interference.

In accordance with the invention, the useful signals of the locating and transmission system to be protected are enveloped by additionally emitted signals (ECCM/OCCM signals) which are independent of the system and by which a jammer having a limited available jamming power, is forced to diminish or shift the density of its spectral jamming output.

In accordance with an advantageous development of the method, the useful signals are enveloped in a time range, a frequency range, and/or a spatial range.

The inventive apparatus for carrying out the method comprises, in an embodiment for enveloping the useful signals in a time range, a transmitter which is provided with an optical or electromagnetic radiator, and a multiplexer which is series-connected thereto and has two inputs, the useful signal being applied to one of the inputs and the ECCM/OCCM signal being applied to the other.

In another embodiment of the inventive apparatus, the useful signals and the ECCM/OCCM signals are applied to respective transmitters along with a synchronous control signal, and the respective transmitters are connected to a coupler in turn connected to a radiator.

In yet another embodiment of the inventive apparatus, the useful signals and the ECCM/OCCM signals are supplied to a separating filler, or network separator, whose output is connected to a radiator.

In still another embodiment of the invention, the useful signals and the ECCM/OCCM counter-counter measure, signals are supplied to separate radiators, with the radiator for the useful signals having a narrow lobar characteristic and the radiator for the ECCM/OCCM signals having a wide lobar characteristic enveloping the narrow lobar characteristic.

The main advantage obtained with the invention is that, due to the transmission of, or counter-counter measure, signals which are independent of the system and serve the purpose of masking the useful signal proper, the jammers are forced to diminish the density of their jamming power in their own useful band of frequencies, or are diverted from their own useful frequency band by a sort of decoy signals. The pulse-duty factor permitting, the active ECCM/OCCM, or counter-counter measure, signals may be generated either in a simple manner, by the transmitters which are already comprised in the originating system, or preferably, by additional, economically operating, sources of transmission, for example, magnetrons. Another advantage of the inventive method is that, for emitting the ECCM/OCCM signals, the optics or antennas already forming part of the originating system can be used simultaneously. Since attention must be paid only to the mutual electromagnetic compatability within the originating system, the ECCM/OCCM signals can be selected and used in a manner which is optimal for the interference. Thus, the inventive method and corresponding apparatus make it possible, without an extensive, additional circuitry, to obtain a completely satisfactory operation of locating and transmission systems even in the presence of intentional interferences.

An object of the invention is to provide an improved method of preventing jamming of locating and transmission systems.

Another object of the invention is to provide an improved apparatus for preventing jamming of locating and transmission systems.

A further object of the invention is to provide such a method and apparatus which is free from the disadvantages of prior art methods and apparatus while ensuring a quite satisfactory, jam-proof operation of locating and transmission systems even in the presence of an adversary's intentional interference.

Yet another object of the invention is to provide such a method and apparatus in which the useful signals of the locating and transmission system to be protected are enveloped by additional emitted counter-counter measure signals which are independent of the system and by which a jammer, having a limited available jamming power, is forced to diminish or shift the density of its spectral jamming output.

For an understanding of the principles of the invention, reference is made to the following description of typical embodiments thereof as illustrated in the accompanying drawings.

DESCRIPTION OF THE PREFERRED EMBODIMENTS

Figure 1A:
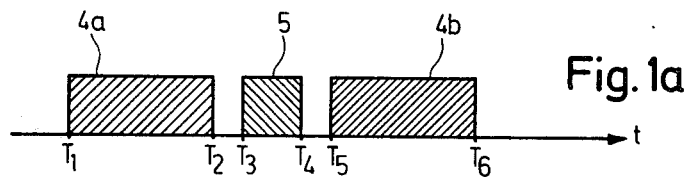
FIGS. 1a and 1b graphically illustrate arrangements of useful and ECCM/OCCM, or counter-counter measure, signals in a time range.
Figure 1B:
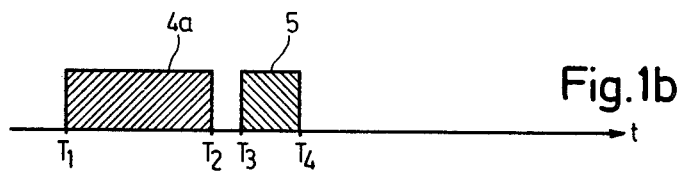

Referring first to FIGS. 1a and 1b, ECCM/OCCM signals are shown in time-enveloping relationship to the useful signal. In FIG. 1a, the ECCM/OCCM signal 4a begins at the time $t = T_1$ and is transmitted up to the time $t = T_2$. The useful signal 5 is transmitted between the times $t = T_3$ and $t = T_4$ and has a shorter duration and another frequency than the ECCM/OCCM signal. A further ECCM/OCCM signal 4b is transmitted between the times $t = T_5$ and $t = T_6$, with either the same frequency as ECCM/OCCM signal 4a or with another frequency.

FIG. 1b shows the same variation in time of the signals. However, the second ECCM/OCCM signal 4b is omitted, i.e., the next cycle starts after the time $t = T_4$, thus again at a time $t = T_1$. While in the time arrangement of FIG. 1a, always two ECCM/OCCM signals 4a and 4b, with the same or another frequency, are transmitted between two useful signals 5, according to FIG. 1b, the ECCM/OCCM signal 4a and the useful signal 5 are transmitted alternately in the same radar frequency band.

Figure 2A:
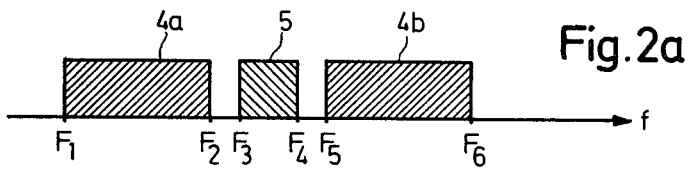
FIGS. 2a and 2b graphically illustrate arrangements of useful and ECCM/OCCM signals in a frequency range.
Figure 2B:
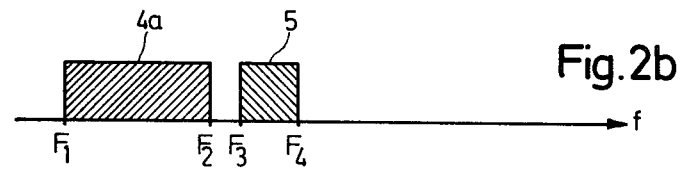

FIGS. 2a and 2b show another arrangement, in which the useful signal 5 is enveloped in the frequency range. According to FIG. 2a, the useful signal 5, having a frequency bandwidth $F_3$–$F_4$, is enveloped, in the direction of lower frequencies, by an ECCM/OCCM signal 4a having a frequency bandwidth $F_2$–$F_1$, and, in the direction of higher frequencies, by a second ECCM/OCCM signal 4b having a frequency bandwidth $F_6$–$F_5$. It is also possible, however, to radiate, in each cycle, only one ECCM/OCCM signal accompanying the useful signal 5 either in the range of lower frequencies, as shown in FIG. 2b, or in the range of frequencies which are higher than that of the useful signal 5. The most suitable arrangement depends on the design of the adversary's jammer.

Figure 3A:
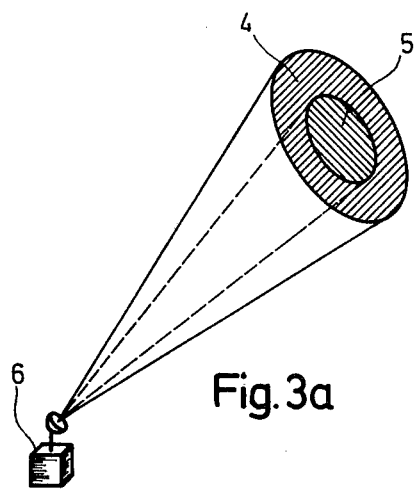
FIGS. 3a and 3b are diagrammatic illustrations of spatially arranged useful and ECCM/OCCM signals.
Figure 3B:
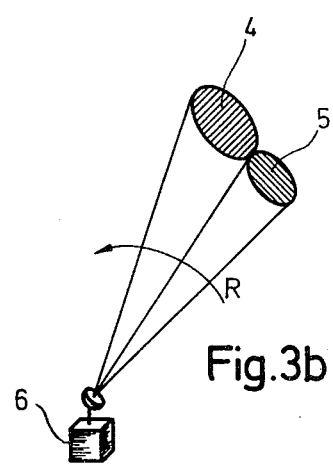

FIGS. 3a and 3b show two possibilities of enveloping useful signals by ECCM/OCCM signals in spatial relationship. According to FIG. 3a, useful signal 5 and ECCM/OCCM signal 4 are transmitted by a transmitter 6 in a pattern of two coaxial cones. The radiation pattern of the ECCM/OCCM signal has the shape of a hollow cone enveloping the inner core pattern of the useful signal. FIG. 3b diagrammatically shows another possibility where useful signal 5 and ECCM/OCCM signal 4 are radiated by a transmitter 6 in the form of two adjacent radiation cones, the surfaces of which are tangent. In the direction of scanning R, the ECCM/OCCM signal 4 precedes the useful signal 5. ECCM/OCCM signal 4 and useful signal 5 have different frequencies, but range in the same radar band.

Figure 4A:
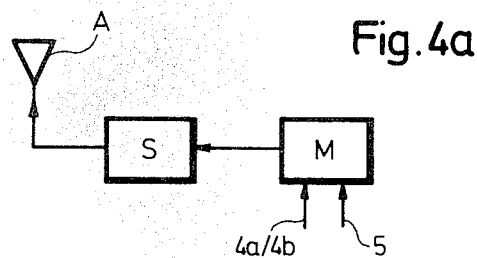
FIGS. 4a and 4b are schematic block diagrams of two devices for adding ECCM/OCCM signals to useful signals in a time range.
Figure 4B:
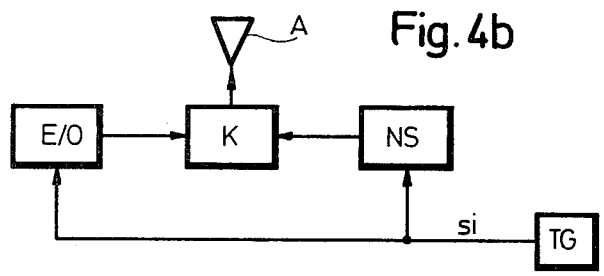

FIGS. 4a and 4b are schematic block diagrams of two different devices for transmitting a useful signal 5 and ECCM/OCCM, or counter-counter measure, signals 4a, 4b successively in predetermined time intervals. In FIG. 4a, useful signal 5 and ECCM/OCCM signals 4a, 4b are applied to respective inputs of a multiplexer M, the output of which is connected to a transmitter S. Transmitter S is followed by an antenna A or an optical radiator. In FIG. 4b, a transmitter E/O, delivering the ECCM/OCCM signals 4a, 4b, and a transmitter NS, delivering the useful signal 5 are controlled by a timing generator TG producing a synchronous control signal si. The outputs of transmitter E/O and transmitter NS are connected to respective inputs of a coupler K, the output of which, in turn, is connected to an antenna or optical device A.

Figure 5:
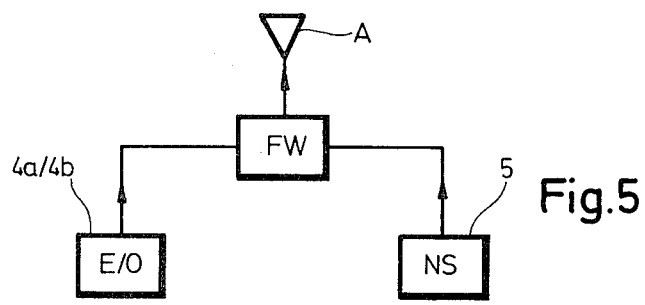
FIG. 5 is a schematic block diagram of a device for inserting ECCM/OCCM signals in a frequency range.

FIG. 5 shows a device for feeding frequency-agile ECCM/OCCM signals. The transmitter E/O, producing the ECCM/OCCM signals 4a, 4b, and the transmitter NS, producing the useful signal 5, have their outputs supplied to respective inputs of a separating filter or network separator FW, the output of which is connected to an antenna or an optical device A.

In FIGS. 4a, 4b, and 5, the overall operating system therefore comprises a transmissions system for transmitting the useful signal 5 constantly or during selected periods, and the additional non-locating signal 4a/4b which is generated independently of the useful signal 5 and which itself can be generated continuously or at selected intervals.

Figure 6:
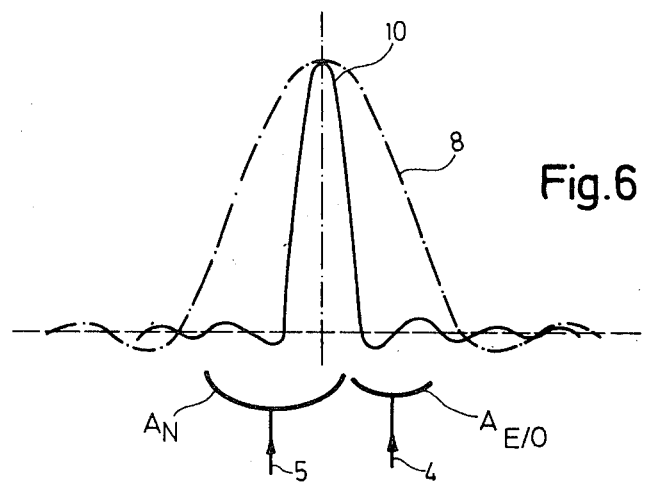
FIG. 6 is a diagrammatic illustration of a device for providing a spatial arrangement of useful and ECCM/OCCM signals during transmission.

FIG. 6 is a schematic representation of a device in which the useful signal, diagrammatically shown at 10, and the ECCM/OCCM signal, diagrammatically shown at 8, are spatially combined with each other. Useful signal 5 is radiated by an antenna or an optical radiator $A_N$ having a radiation pattern in the form of a very narrow lobe 10. Immediately adjacent antenna $A_N$, there is another antenna or optical radiator $A_{E/O}$ radiating the ECCM/OCCM signals 4 in the same direction but with a very wide radiation lobe 8. In this way, the useful signal 5 is enveloped in space by the ECCM/OCCM signal.

It is useful to design the inventive device in a manner such that the power density of the active ECCM/OCCM signals at the location of reception is considerably higher than, or at least equal to, the power density of the operational useful signals.

The mutual compatibility of the active ECCM/OCCM, or counter-counter measure, signals with the useful signals of the originating radar system may be obtained by a selection in the time, frequency, or spatial ranges, or by a combination along these selection lines. If necessary, a time selection may be obtained also by a mutual interlocking by means of synchronizing pulses.

While specific embodiments of the invention have been shown and described in detail to illustrate the application of the principles of the invention, it will be understood that the invention may be embodied otherwise without departing from such principles.

What is claimed is:

1. Apparatus for preventing jamming of locating and transmission systems, transmitting useful signals from an originating station, by a jammer having a limited available jamming power, said apparatus comprising, in combination, signal radiating means, at said originating station, including at least one radiator; means supplying said useful signals to said radiating means; and means supplying, to said radiating means, additional non-processed signals, independent of said useful signals of said locating and transmission system, in an enveloping relation with said useful signals and effective to force the jammer to diminish or shift the density of its spectral jamming output, in which the useful signals are enveloped by the additional signals in a frequency range, said apparatus comprising a frequency-dividing network having an output connected to said signal radiating means and having two inputs; a first transmitter of the useful signals connected to one input of said frequency-dividing network; and a second transmitter of the additional signals separate from said first transmitter, constituted by counter-counter measure signals, connected to the other input of said frequency-dividing network.

2. Apparatus for preventing jamming of locating and transmission systems, transmitting useful signals from an originating station, by a jammer having a limited available jamming power, said apparatus comprising, in combination, signal radiating means, at said originating station, including at least one radiator; means supplying said useful signals to said radiating means; and means supplying, to said radiating means, additional signals, independent of said useful signals of said locating and transmission system, in an enveloping relation with said useful signals and effective to force the jammer to diminish or shift the density of its spectral jamming output in which the useful signals are enveloped by the additional signals in the spatial range, said apparatus comprising one radiator having a conical radiation pattern for the useful signals at a first frequency and a second radiator having a concentric conical shell radiation pattern for the additional signals at a second different frequency, constituted by counter-counter measure signals.

3. Apparatus for preventing jamming of locating and transmission systems, transmitting useful signals from an originating station, by a jammer having a limited available jamming power, said apparatus comprising, in combination, signal radiating means, at said originating station, including at least one radiator; means supplying said useful signals to said radiating means; and means supplying, to said radiating means, additional signals, independent of said useful signals of said locating and transmission system, in an enveloping relation with said useful signals and effective to force the jammer to diminish or shift the density of its spectral jamming ouput, in which the useful signals are enveloped by the additional signals in the spatial range, said apparatus comprising one radiator designed to have a first conical radiation pattern for the useful signals at a first frequency and a second conical radiation pattern for the additional signals at a second different frequency, constituted by counter-counter measure signals, tangent to said first conical radiation pattern and leading said first conical radiation pattern in the scanning direction.

4. Apparatus for preventing jamming of locating and transmission systems, transmitting useful signals from an originating station, by a jammer having a limited available jamming power, said apparatus comprising, in combination, signal radiating means, at said originating station, including at least one radiator; means supplying said useful signals to said radiating means; and means supplying, to said radiating means, additional signals, independent of said useful signals of said locating and transmission system, in an enveloping relation with said useful signals and effective to force the jammer to diminish or shift the density of its spectral jamming output, in which the useful signals are enveloped by the additional signals in the spatial range, said appartus comprising first and second radiators arranged side-by-side; said first radiator radiating the useful signals at a first frequency and having a narrow lobar characteristic; said second radiator radiating counter-counter measure signals at a second different frequency, constituting said additional signals, and having a wide lobar characteristic enveloping said narrow lobar characteristic.

5. A method for preventing jamming of locating and transmission systems, transmitting useful signals from an originating station, by a jammer having a limited available jamming power, said method comprising enveloping the useful signals by additional signals, transmitted from the originating station, and which are independent of the locating and transmission system and effective to force the jammer to diminish or shift the density of its spectral jamming output, including the step of enveloping the useful signals by the additional signals, independent of the useful signals, in a spatial range with the useful signals and the additional signals having frequencies differing from each other.

* * * * *